Jan. 13, 1959  T. J. McGUFF  2,867,989
WATER SEPARATOR DE-ICING CONTROL
Filed Feb. 17, 1955  2 Sheets-Sheet 1
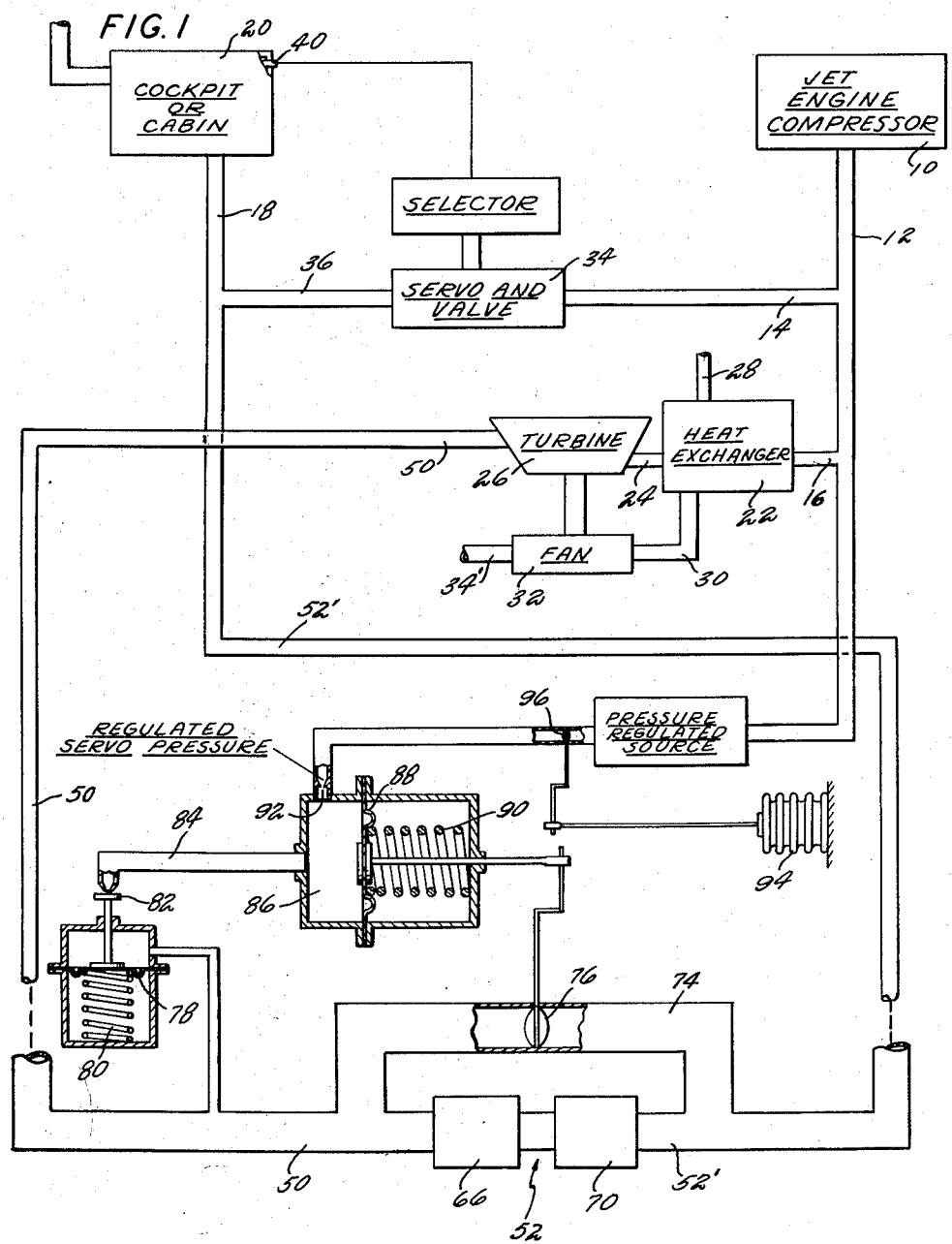
INVENTOR
THOMAS J. McGUFF
BY Harris & Luther
ATTORNEY

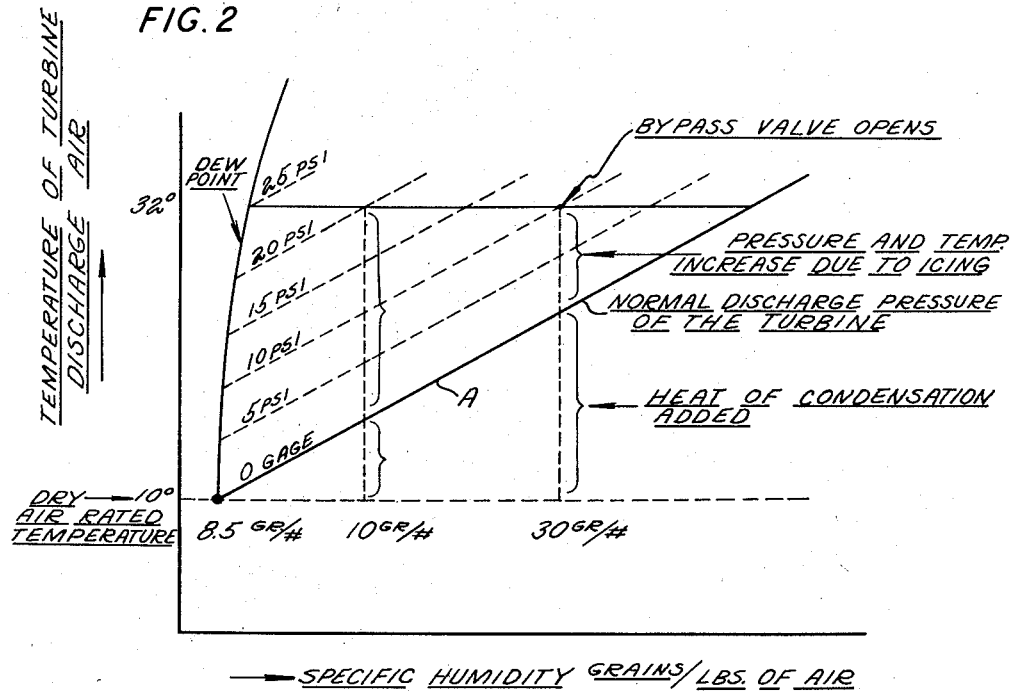

United States Patent Office 2,867,989
Patented Jan. 13, 1959

2,867,989

WATER SEPARATOR DE-ICING CONTROL

Thomas J. McGuff, Warehouse Point, Conn., assignor to United Aircraft Corporation, East Hartford, Conn., a corporation of Delaware Application February 17, 1955, Serial No. 488,821

7 Claims. (Cl. 62—150)

This invention relates to a water separator and more particularly to a water separator de-icing control.

An object of this invention is mechanism which will effect de-icing of the water separator when the entrained water exceeds a predetermined amount.

A further object is mechanism for by-passing the water separator when the entrained water content is below a predetermined amount.

A further object is a water separator by-pass and means maintaining the by-pass closed to cause a pressure rise in front of the separator sufficient to cause a temperature above freezing when the water content of the air is above a predetermined amount, and opening the by-pass at temperatures below freezing when the moisture content of the air is below a predetermined amount.

A further object is to limit the pressure build-up in a frozen separator so as to cause de-icing only when the water content exceeds a predetermined amount.

A further object is mechanism to by-pass the water separator when ambient pressure is below a predetermined amount.

Other and additional objects will be apparent from the following specification and the attached drawings in which:

Fig. 1 is a schematic drawing showing the general arrangement of an airplane air conditioning system including a water separator and a by-pass valve with its pressure control actuating mechanism.

Fig. 2 is a curve showing the effect of the specific humidity of the cooled air on its final temperature.

The design of an air conditioning system for the present-day aircraft entails the consideration of several factors which vary with changes in flight operation and which dictate the requirements of the system. For example, during ground operation and at low level flight the system may be required to deliver a cooling air stream to the aircraft cabin or cockpit to provide comfortable conditions for the occupants thereof. At moderate altitudes the system may be required to deliver a warm air stream and during high-altitude, high-speed operation the system will probably be called upon for a cold air supply.

In the past, various systems have been developed to utilize a compressed air source, such as a bleed from the compressor of a turbine, and to supply air at the various temperatures required for cabin comfort. In such systems some of the hot compressed air is cooled by conventional means to provide cold air cabin supply and some of the hot compressed air is utilized to supply a hot air supply. The hot and cold air supply are mixed in varying proportions and led to the cabin or cockpit to obtain the desired cabin air temperature.

The systems may also be adapted in accordance with conventional practices to maintain a selected cabin pressure. Since the present invention relates primarily to improvements in the air temperature control as distinct from the pressure control, pressure control will be only briefly referred to.

The present invention may be briefly described as embracing improvements in the control of the water content of air being delivered through the air temperature control system to an airplane compartment. It has been found that under some conditions air fed to an airplane compartment contains sufficient moisture to cause rain or snow in the airplane compartment. In order to eliminate this feature, a water separator is inserted into cold air discharge from the cooling turbine to remove the moisture from the cooled air, thus reduce the moisture contents of the mixed air fed to the cabin to such an extent that the dew point will be below the cabin temperature. Because the ability of air to hold moisture is proportional to temperature of the air, air at turbine discharge temperature which is considerably lower than ambient temperature is, for at least some operating conditions, in a state of super saturation. By removing the free moisture from this cooled air, although its relative humidity will not be reduced to below 100%, the mixture of this cold air and the warm air fed to the compartment will, because the temperature of the mixture is higher than the cold air, have a relative humidity below 100% and fogging will thus be prevented.

Referring to the drawings, the specific embodiment chosen to illustrate the invention for purposes of explanation, but not limitation, comprises a source of compressed air which may be the compressor 10 of a jet or turbine engine. Hot air from this compressor is led through line 12 and through two parallel lines 14 and 16 to the cabin inlet conduit 18. Air which is discharged from the compressor 10 to the conduit 16 is cooled to provide the previously mentioned cold air supply for the compartment 20 and the air which is discharged to the conduit 14 by-passes the cooling system and provides the hot air supply for the cabin which is mixed with the cold air supply to provide a supply of selected temperature.

With specific reference to the cold air supply, it will be noted that air in conduit 16 is passed through a heat exchanger 22 to give up a major portion of its heat and is then passed through conduit 24 to drive a turbine 26 which will remove energy from the air stream air and, in so doing, further reduce the air temperature. The cooled air is fed from the turbine 26 to the conduit 50 and through a water separator 52 to the cabin inlet conduit 18. The cooling air for the heat exchanger is introduced through a line 28 which may be supplied with ram air. After passing through the heat exchanger 22, the cooling air is led through conduit 30 and a fan 32 driven by the turbine 26, and is then discharged overboard through a conduit 34'. The fan 32 provides a load for the turbine 26, permitting the turbine to extract energy from the air passing through the turbine.

The hot air supply fed through by-pass 14 is controlled by a valve 34 and is then led through a conduit 36 to the cabin air inlet conduit 18. The hot air supply from the conduit 36 and the cold air supply from the water separator 52 are mixed in the cabin air inlet conduit 18 before introduction to the cabin. The proportion of the mixture is controlled by valve mechanism 34 which is automatically operable in response to temperature responsive means 40 in the cabin 20.

The system has been described without consideration of the pressure requirements for various altitudes and varying conditions of flight operations. For purposes of simplicity, it may be assumed that the system will deliver air to the cabin under pressure sufficient for all flight conditions and a pressure responsive cabin ventilator or relief valve is arranged to maintain cabin pressure at a desired or selected level. As this application is directed primarily to the water separator portion of the air temperature control system, it is believed unnecessary to supply further details of the cabin air supply. Reference may be made however to application Serial No. 471,152 of Sims and Farkas for Cabin Temperature Control System for further details of the system.

The water separator is shown schematically in the application Serial No. 488,822 of McGuff and Reinhardt, now Patent No. 2,835,340 for Moisture Separator and filed on even date herewith to which reference may be made for further details. Broadly the water separator comprises a coalescer 66 and a collector 70 arranged in series in an air duct 50, 52' and having a valve 76 arranged in a by-pass conduit 74 around the water separator.

The air discharged from the turbine 26 at some conditions of operations will be below freezing temperature. At these temperatures, the water, snow, or ice impinging on the coalescer will freeze and tend to block the coalescer and prevent the passage of air therethrough.

The restricted or blocked water separator will cause the turbine discharge pressure to rise which will cause the air temperature to also increase. This increase in temperature will tend to melt the ice on the coalescer and thus again open a path through the water separator. The opening of the path through the separator will reduce the turbine back pressure and permit the temperature and pressure to again drop so that the coalescer will be working on the verge of freezing all the time.

If the specific humidity of the air being discharged by the turbine is below a predetermined amount, say 30 grains per pound of air, it has been found that entirely satisfactory results can be obtained by completely by-passing the water separator, as the water content of the air is then below the amount that would produce undesirable conditions in the airplane compartment. With this lower humidity value it is then permissible to allow the turbine discharge to remain below freezing and the separator incapacitated by freezing.

It has been found that by limiting the pressure at the turbine discharge it is possible to maintain the turbine discharge temperature above freezing for all specific humidities above the selected value and permit freezing to occur at specific humidities below the selected value.

In Fig. 3, line A represents the temperature and specific humidity characteristics of the cooled air as it is discharged under one set of operating conditions from the turbine. As the extreme lefthand line represents the dew point, it will be appreciated that everything to the right thereof is in a super saturated condition; hence, air at 10° and zero gage pressure will be in a saturated condition when it contains 8.5 grains per pound of air and any water in excess will be in the form of minute droplets, having condensed and thereby added heat to the air; hence, air at the same pressure but containing 10 grains per pound will be at a higher temperature than the air containing only 8.5 grains per pound. This will produce the upward slope of line A.

If the water separator ices up and increases the pressure of the turbine discharge, the characteristics of the air will be represented by the dotted lines running parallel to line A. A unit increase in pressure will raise the air temperature a specified amount, regardless of the amount of excess water present in the air. Therefore, in order to raise the temperature of the air to 32° when there are 10 grains of water per pound of air, it will be necessary to build the pressure up to a point where it is 20 pounds per square inch above the normal discharge pressure of the turbine shown in the curve as 0 pounds per square inch gage. If there are 30 grains of water present per pound of air, so much heat will have been added by the condensation of additional water that it will be necessary to raise the pressure only 10 pounds in order to bring the temperature up to or above freezing.

It has been found that in general air containing 30 grains per pound, or less, will have no harmful effects when mixed with the warmer air and introduced to the cabin, as the resultant relative humidity of the entire mass will be less than 100%. Under such conditions the water separator can be completely eliminated and the turbine discharge by-passed around the water separator. Hence, by making the by-pass valve 76 pressure actuated, we can arrange to open the valve whenever the pressure rises to 10 pounds per square inch and thus be assured that the water separator will be thawed out and become effective to extract moisture that might have a harmful effect, but that for lesser humidities it will be unnecessary to build up the high pressure required to keep the water separator from freezing.

As shown in Fig. 1, the pressure responsive bellows or diaphragm 78 is connected to the duct 59 upstream of the water separator so as to be responsive to the pressure in the turbine discharge adjacent to the water separator entrance. An increase in turbine discharge pressure will compress spring 80 and open bleed valve 82, bleeding air through conduit 84 from the chamber 86 of servo motor 88. Bleeding of air from chamber 86 will permit spring 90 to open valve 76 and by-pass the water separator. Chamber 86 is supplied with servo pressure from any suitable regulated pressure source through a fixed orifice 92 so that the pressure in chamber 86 can be controlled by small movements of the valve 82.

In aircraft designed for operation at high altitudes, water separation in the air conditioning system may be unnecessary at the higher altitudes because of the low specific humidity of the air at those altitudes. In order to take advantage of this feature, a bellows or other ambient pressure responsive means 94 is connected to close a valve 96 when the ambient pressure drops to a preselected amount such as that at 25,000 foot altitudes. Although this mechanism is shown as acting directly on valve 96, it will be appreciated that a servo mechanism of any suitable type, such as that just described, might be used. Closing of the valve 96 will disable the effect of the pressure responsive bellows 78 and permit the spring 90 to move the servo piston 88 and open the valve 76 to by-pass the water separator when the ambient pressure drops to a preselected amount.

It is to be understood that the invention is not limited to the specific embodiment herein illustrated and described, and may be used in other ways without departure from its spirit as defined by the following claims.

I claim:

1. In combination with a water separator having an inlet and having a flow of moisture laden air normally flowing therethrough, by-pass means connected with said inlet and controlled by the pressure at the separator inlet for by-passing said separator and limiting the pressure rise in the inlet to said separator, means responsive to the ambient pressure for actuating said by-pass means and by-passing said separator when the ambient pressure is reduced below a preselected value less than sea-level pressure.

2. In combination with a water separator having an air intake receiving air for an airplane air conditioning system and subject to blocking and reduction in flow by freezing, an air supply directed to said intake and subject to increase its pressure and temperature upon a reduction in flow, a conduit connected with said intake and forming a by-pass around said separator, a valve in said by-pass controlling air flow through said by-pass, means responsive to the pressure at the separator intake, means controlled by said pressure-responsive means for opening said valve when said pressure exceeds a predetermined value, and means responsive to ambient pressure and overriding said pressure responsive means for opening said valve when the ambient pressure is less than a predetermined value.

3. In a device for separating water from a super saturated cooled air stream whose temperature is below freezing and may cause blocking of the separator by freezing, a separator entrance, conduit means for by-passing said air around said water separator when the moisture content of the air is low enough to render water separation unnecessary and the separator is blocked by freezing, conduit control means including means normally blocking said conduit means and comprising pressure responsive means actuated by the pressure at the entrance to said separator for opening said conduit means when said pressure rises to a predetermined value, said pressure responsive means acting to hold said predetermined pressure when the moisture content of the air increases to render water separation necessary until the air temperature is raised to above freezing by the increase in temperature due to the heat of condensation of condensed moisture, and means responsive to ambient pressure for opening said conduit means when the ambient pressure drops to a predetermined value.

4. In combination with a water separator for separating water from a cooled airstream whose temperature may drop to below freezing, said separator having an inlet and an outlet, said airstream subject to a pressure and a temperature rise at the separator inlet when blocked by freezing of water in the separator and subject to a further temperature rise in proportion to the water content of the airstream, conduit means, including pressure regulating means controlling flow through said conduit and set for a selected pressure value, connecting said inlet with said outlet and forming a bypass, said pressure regulating means regulating the pressure of the airstream at the separator inlet by opening said bypass when said inlet pressure exceeds said selected value, said pressure regulator maintaining said selected pressure by limiting the opening of said bypass to maintain the temperature of the airstream at the separator inlet above freezing and preventing complete blocking of the separator by freezing when the moisture content of the air is high enough to render moisture separation necessary in the intended use of the air and completely bypassing said separator when the separator is completely blocked by freezing and the water content of the air is low enough to render water separation unnecessary in the intended use of the air.

5. In combination, in a system having an airstream with a critical specific humidity, an air cycle turbine receiving moisture laden air under pressure from said airstream and cooling said air to below a freezing temperature by extracting energy therefrom and reducing the pressure, a water separator having an inlet and outlet, said inlet connected with said turbine and receiving the wet, cooled air exhausted from said turbine, said separator being subject to blocking by freezing, said blocking causing a pressure rise in said inlet and on said turbine, a conduit connecting said inlet with said outlet and forming a bypass around said separator, and means responsive to the pressure of air exhaust from said turbine for regulating said exhaust pressure by controlling the flow through said conduit around said separator and directly from said inlet to said outlet, said means maintaining a back pressure on said turbine when said separator becomes blocked by freezing, said pressure responsive means limiting said pressure rise.

6. In combination, in a system having an airstream with a critical specific humidity, an air cycle turbine receiving moisture laden air under pressure from said airstream and cooling said air to below a freezing temperature by extracting energy therefrom and reducing the pressure, a water separator having an inlet and outlet, said inlet connected with said turbine and receiving the wet, cooled air exhausted from said turbine, said water separator being subject to blocking by freezing, said blocking causing a pressure rise in said inlet and on said turbine, a conduit connecting said inlet with said outlet and forming a bypass around said separator, and means responsive to the pressure of air exhaust from said turbine for regulating said exhaust pressure by controlling the flow through said conduit around said separator and directly from said inlet to said outlet, said means maintaining a back pressure on said turbine when said water separator becomes blocked by freezing, said back pressure producing a temperature above freezing when the water content of the air is greater than a predetermined number of grains per pound of cooled air and bypassing said water separator blocked by freezing when the water content is less than a predetermined number of grains per pound of cooled air.

7. In combination, in a system having an airstream with a critical specific humidity, an air cycle turbine receiving moisture laden air under pressure from said airstream and cooling said air to below a freezing temperature by extracting energy therefrom and reducing the pressure, a water separator having an inlet and outlet, said inlet connected with said turbine and receiving the wet, cooled air exhausted from said turbine, said separator being subject to blocking by freezing, said blocking causing a pressure rise in said inlet and on said turbine, a conduit connecting said inlet with said outlet and forming a bypass around said separator, and means responsive to the pressure of air exhaust from said turbine for regulating said exhaust pressure by controlling the flow through said conduit around said separator and directly from said inlet to said outlet, said means maintaining a back pressure on said turbine when said separator becomes blocked by freezing, which pressure will produce a temperature above freezing when the water content of the air is greater than approximately 30 grains per pound of cooled air and bypassing all the flow at temperature below freezing when the water content is less than approximately 30 grains per pound of cooled air.

References Cited in the file of this patent

UNITED STATES PATENTS

| | | |
|---|---|---|
| 1,711,779 | Farmer | May 7, 1929 |
| 2,485,522 | Andersen | Oct. 18, 1949 |
| 2,661,076 | Walker | Dec. 1, 1953 |

FOREIGN PATENTS

| | | |
|---|---|---|
| 114,286 | Australia | Nov. 24, 1941 |